(12) United States Patent
Morinaga et al.

(10) Patent No.: US 9,150,239 B2
(45) Date of Patent: Oct. 6, 2015

(54) STEERING APPARATUS FOR A VEHICLE

(71) Applicant: AISIN SEIKI KABUSHIKI KAISHA, Kariya-shi (JP)

(72) Inventors: Shinya Morinaga, Kariya (JP); Yasuaki Kurokawa, Nagoya (JP); Takeshi Marutani, Nishio (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/376,471

(22) PCT Filed: Dec. 25, 2012

(86) PCT No.: PCT/JP2012/083377
§ 371 (c)(1),
(2) Date: Aug. 4, 2014

(87) PCT Pub. No.: WO2013/118411
PCT Pub. Date: Aug. 15, 2013

(65) Prior Publication Data
US 2015/0048608 A1    Feb. 19, 2015

(30) Foreign Application Priority Data

Feb. 10, 2012  (JP) .................................. 2012-027785
Feb. 10, 2012  (JP) .................................. 2012-027787

(51) Int. Cl.
*B62D 1/18*    (2006.01)
*B62D 1/181*   (2006.01)
*B62D 1/189*   (2006.01)

(52) U.S. Cl.
CPC ................ *B62D 1/181* (2013.01); *B62D 1/189* (2013.01)

(58) Field of Classification Search
CPC ................................ B62D 1/181; B62D 1/189
See application file for complete search history.

(56) References Cited

U.S. PATENT DOCUMENTS

2004/0023746 A1*  2/2004  Arihara .......................... 475/280
2015/0061271 A1*  3/2015  Morinaga et al. ............. 280/775

FOREIGN PATENT DOCUMENTS

JP    2000-280916 A    10/2000
JP    2004-262323 A     9/2004
(Continued)

OTHER PUBLICATIONS

International Search Report (PCT/ISA/210) mailed on Mar. 19, 2013, by the Japanese Patent Office as the International Searching Authority for International Application No. PCT/JP2012/083377.

*Primary Examiner* — Faye M Fleming
(74) *Attorney, Agent, or Firm* — Buchanan Ingersoll & Rooney (57) ABSTRACT

A steering apparatus is capable of configuring an electrically operated tilt mechanism, which is interchangeable with a manually operated tilt mechanism, and which is small in size and easily mounted on a vehicle. A tilt bracket holding a steering column and supported on the fixing bracket to be relatively movable thereto, and a tilt shaft extending in a lateral direction of the vehicle body and supported on the fixing bracket to be relatively movable thereto in an axial direction of the steering column are provided. By way of a driving unit, the tilt bracket is rotated about the tilt shaft axis to adjust a relative position of the tilt shaft to the fixing bracket. Furthermore, a tilt slider is disposed between an elongated hole on the fixing bracket and the tilt shaft, and a biasing member biasing the tilt slider in the axial direction of the tilt shaft.

10 Claims, 12 Drawing Sheets

(56) References Cited

FOREIGN PATENT DOCUMENTS

| | | | |
|---|---|---|---|
| JP | 2004338551 A | * 12/2004 | ............... B62D 1/19 |
| JP | 2006-264547 A | 10/2006 | |
| JP | 2006-327374 A | 12/2006 | |
| JP | 2008-247160 A | 10/2008 | |
| JP | 2009-029325 A | 2/2009 | |
| JP | 2009-292429 A | 12/2009 | |

* cited by examiner

STEERING APPARATUS FOR A VEHICLE

TECHNICAL FIELD

The present invention relates to a steering apparatus for a vehicle, and particularly to the steering apparatus for supporting a steering column on a vehicle body to be swingable and adjusting it to be placed at a desired tilt position.

BACKGROUND ART

As a mechanism for adjusting an operative position of a steering wheel to be placed at a desired tilt position, an electrically operated tilt mechanism is known. For example, in the following Patent document 1, it is aimed "to provide a steering apparatus to be capable of suppressing backlash in a vertical direction without affecting a tilting operation" (described in Paragraph [0004] of the Patent document 1), and "in a steering apparatus comprising a steering shaft connected to a steering wheel, a steering column having a cylindrical column housing receiving and supporting the steering shaft rotatably, and fixed to a vehicle body by a fixing bracket, and a tilt mechanism adjusting tilted amount of the steering column relative to the fixing bracket based on operation of a tilt motor, the tilt mechanism comprises a shaft rotated by the tilt motor, a slide member sliding on the shaft based on rotation of the shaft, and a link mechanism connecting the column housing to the slide member and the fixing bracket, and tilting the steering column relative to the fixing bracket based on sliding of the slide member, wherein the link mechanism is placed on both of left and right sides of the column housing at the outer side in the radial direction of the column housing" is proposed (described in Paragraph [0005] of the same).

Also, in the following Patent document 2, it is aimed "to provide a steering apparatus to be capable of commonly providing a steering column regardless of a driving system of a tilt-telescopic mechanism" (described in Paragraph [0005] of Patent document 2), and "in a steering apparatus comprising a steering shaft installed with a steering wheel, a steering column receiving and supporting the steering shaft rotatably, and a bracket for installing a steering position adjusting mechanism on the steering column, the steering column is configured to be attachable to and detachable from the steering column" is proposed (described in Paragraph [0006] of the same). Furthermore, "the bracket is a support bracket for installing a manually operated tilt-telescopic mechanism or a base bracket for installing an electrically operated tilt-telescopic mechanism" is described (in Paragraph of the same), and "installing portions of the support bracket and the installing portion of the base bracket are to be commonly provided" is described (in Paragraph [0009] of the same).

Furthermore, as a technology for preventing a backrush between a screw shaft and a nut member of an electrically operated tilt mechanism to ensure a smooth slidability, in the following Patent document 3, for example, "a slider mechanism characterized in comprising a shaft having a male screw portion rotating with an output shaft of a driving source, an approximately cylindrical female screw member disposed around the male screw portion with its rotation being limited to a rotating direction of the shaft, and meshed with the male screw portion and moved with an object to be driven, a biasing member biasing the female screw member in a radial direction, and a pressing member having an abutting portion abutting on the male screw portion, applied with a reaction force of the biasing force of the biasing member, the reaction force acting as an abutting force between the male screw portion and the abutting portion" is proposed (in Paragraph [0011] of Patent document 3). And, "the approximately cylindrical female screw member is biased by the biasing force of the biasing member in the radial direction to surely abut on the male portion of the shaft, and the reaction force of its biasing force is surely received by the pressing member, with the abutting portion being surely abutted on the male screw portion of the shaft, the backrush of the meshed potion of the screws being forced to be eliminated" is described (in Paragraph [0012] of the same).

PRIOR ART DOCUMENT

Patent Document

Patent document 1:
Japanese Patent Laid-open Publication No.2006-327374
Patent document 2:
Japanese Patent Laid-open Publication No.2006-264547
Patent document 3:
Japanese Patent Laid-open Publication No.2000-280916

SUMMARY OF THE INVENTION

Problems to be Solved by the Invention

The tilt steering apparatus as disclosed in the above Patent document 1 is configured to transform an output of the tilt motor (electric motor) into a linear motion by the slide mechanism using the screw shaft (trapezoidal screw or the like), and transform it into a vertical displacement (tilting motion) of the steering wheel by means of the link mechanism using a bell crank, and the electrically operated tilt mechanism comprises a lot of parts such as the electric motor configuring the driving unit, link mechanism and the like, and it is large in size, so that it is difficult to install it on a vehicle. Also, according to the technology as described in the Patent document 3, it was aimed to prevent the backrush between the shaft (screw shaft) rotating with the output shaft of the driving source and the slider (nut member), and furthermore the biasing member (spring) and the pressing member or the like are required, so that number of parts is large and assembling time increases. In any of the documents, the structures are much different from those of the manually operated tilt mechanism, and are not designed to be interchangeable with those of the manually operated tilt mechanism, so that it can not be expected to provide common parts for those structures.

On the other hand, according to the steering apparatus as disclosed in the above Patent document 2, it is proposed to commonly provide a bracket installing portion for the manually operated tilt mechanism and the electrically operated tilt mechanism. If each tilt mechanism portion is made in a sub-assembly, and made possible to be installed on and detached from the steering column, it will be possible to properly select either one of them, with the steering column being commonly provided. However, the tilt mechanism portions as described in the above Patent document 2 employ the structures for the prior manually operated tilt mechanism and electrically operated tilt mechanism. Therefore, the electrically operated tilt mechanism is large like the prior one, so that it is difficult to install it on a vehicle.

Therefore, according to the present invention, in a steering apparatus for adjusting a steering column to be placed at a desired tilt position, it is an object to provide the steering apparatus capable of configuring an electrically operated tilt mechanism, which is interchangeable with a manually operated tilt mechanism, and which is small in size and easily mounted on a vehicle.

Furthermore, it is an object to provide a steering apparatus capable of configuring an electrically operated tilt mechanism, which prevents a backrush occurred in response to a tilting operation to ensure a smooth operation, and which is small in size and easily mounted on a vehicle.

Means for Solving the Problems

To solve the above-described problems, according to the present invention, a steering apparatus for a vehicle comprises a fixing bracket fixed to a vehicle body, a steering column supported on the vehicle body to be swingable, a tilt bracket holding the steering column and supported on the fixing bracket to be relatively movable thereto, a tilt shaft extending in a lateral direction of the vehicle body and supported on the fixing bracket to be relatively movable thereto in an axial direction of the steering column, and a driving unit rotating the tilt bracket about an axis of the tilt shaft to adjust a relative position of the tilt bracket to the fixing bracket.

In the steering apparatus as described above, the driving unit may comprise a crank member with one end thereof fixed to the tilt shaft, an electric motor fixed to the tilt bracket, and a speed reducer reducing an output of the electric motor and rotating the other end of the crank member.

In the steering apparatus as described above, the fixing bracket may be formed with elongated holes having elongated dimensions in the axial direction of the steering column, and the tilt shaft may be configured to be supported in the elongated holes to be relatively movable thereto. Furthermore, it may comprise a tilt slider disposed between each elongated hole and the tilt shaft, and a biasing member biasing the tilt slider in the axial direction of the tilt shaft.

In the steering apparatus as described above, the tilt slider may be a hollow circular truncated conical member having a cutout portion in an axial direction thereof, and an inner diameter of a hollow portion of the hollow circular truncated conical member may be set to be smaller than an outer diameter of the tilt shaft, a minimal outer diameter of the hollow circular truncated conical member may be smaller than a dimension of a shorter side of the elongated hole, and a maximal outer diameter of the hollow circular truncated conical member may be larger than the dimension of the shorter side of the elongated hole.

In the steering apparatus as described above, the biasing member may be configured by a disc spring biasing the tilt slider in the axial direction of the tilt shaft. Or, the biasing member may be configured by a coil spring mounted on the tilt shaft to bias the tilt slider in the axial direction of the tilt shaft. And, it may further comprise a bush fitted into the elongated hole, and disposed between the fixing bracket and the tilt slider.

In the steering apparatus as described above, the tilt shaft may be divided into two members, and opposed end portions thereof may be configured to be connected with the crank member.

The speed reducer may comprise a first worm gear fixed to an output shaft of the electric motor, a first worm wheel meshed with the first worm gear, a second worm gear rotated integrally with the first worm wheel, and a second worm wheel meshed with the second worm gear, and a rotation shaft of the second worm wheel may be configured to be fixed to the other end of the crank member.

Effects of the Invention

As the present invention has been configured as described above, the following effects are achieved. That is, according to the steering apparatus of the present invention, the tilt bracket, tilt shaft and driving unit configured as described above are provided, and the driving unit is configured to rotate the tilt bracket about an axis of the tilt shaft and adjust a relative position of the tilt bracket to the fixing bracket, so that a simple and easily assembled small electrically operated tilt mechanism can be configured with smaller number of parts than those in the prior art. Therefore, an inexpensive apparatus which is easily mounted on a vehicle can be provided. Particularly, as the electrically operated tilt mechanism can be configured in about the same scale as the manually operated tilt mechanism, the steering apparatus based on the manually operated tilt mechanism for example can be changed into that of the electrically operated one, maintaining it to be easily mounted on the vehicle. On the contrary, if the parts for the manually operated tilt mechanism are installed on the same fixing bracket and tilt bracket as those described above, the steering apparatus having the manually operated tilt mechanism can be configured simply and easily, so that it is interchangeable with the manually operated tilt mechanism.

For example, if the above-described driving unit is provided with the crank member, electric motor and speed reducer as described above, and it is configured that the output of the electric motor is reduced to rotate the crank member, it can be formed small in size, with small number of parts, without requiring the prior slide mechanism or link mechanism.

Furthermore, if the fixing bracket is formed with elongated holes, and the tilt shaft is configured to be supported in the elongated holes to be movable relatively thereto, the apparatus as a whole can be made simple and inexpensive.

Furthermore, if it is provided with the tilt slider disposed between each elongated hole and the tilt shaft, and the biasing member biasing the tilt slider in the axial direction of the tilt shaft, the backlash resulted from the tilting operation can be surely prevented, to ensure a smooth operation.

In the steering apparatus as described above, if the tilt slider is configured by the hollow circular truncated conical member having the cutout portion in an axial direction thereof, and its inner diameter is set to be smaller than the outer diameter of the tilt shaft, with the minimal outer diameter being smaller than the dimension of the shorter side of the elongated hole, and with the maximal outer diameter being larger than the dimension of the shorter side of the elongated hole, the backlash resulted from the tilting operation can be surely prevented. The biasing member may be configured by a simple and inexpensive member, such as a disc spring or coil spring. Furthermore, if the bush is fitted into the elongated hole, a smooth sliding operation of the tilt slider relative to the fixing bracket can be ensured.

Furthermore, if the tilt shaft is divided into two members, and the opposed end portions thereof are to be connected with the crank member, an appropriate assembling property can be ensured.

As for the speed reducer, if it comprises the first and second worm gears, and first and second worm wheels, and if the rotation shaft of the second worm wheel is configured to be fixed to the other end of the crank member, such an appropriate apparatus can be provided that a reverse efficiency can be made as small as possible.

EMBODIMENTS FOR CARRYING OUT THE INVENTION

Hereinafter, will be explained desirable embodiments of the present invention referring to drawings. FIGS. 1-4 show a configuration of a steering apparatus 101 according to an embodiment of the present invention, wherein a steering column 10 is supported on a vehicle body 100 to be swingable, and it is configured such that the steering column 10 can be adjusted to be placed at a tilt position with a desired tilt angle relative to a fixing bracket 1. As for a structure for mounting the steering column 10 on the vehicle body 100, a tilt bracket 2 is supported on the fixing bracket 1 fixed to the vehicle body 100, to be relatively movable thereto. A middle potion of the steering column 10 is held by the tilt bracket 2, and supported to be swingable about a swinging center (C) provided at a front part of the vehicle body 100.

The steering column 10 has a steering shaft 11 and a main tube 12 placed on a common axis so as to enclose the steering shaft 11. A steering wheel (not shown) is supported on a rear end of the steering shaft 11, a front end of which is connected to a steering mechanism (not shown). The steering shaft 11 has a cylindrical upper shaft 11a, a rear end of which is connected to the steering wheel (not shown), and a lower shaft 11b which is connected to a front end of the upper shaft 11a. That is, the upper shaft 11a and the lower shaft 11b are connected to be relatively movable in an axial direction, and the front end of the lower shaft 11b is connected to the steering mechanism (not shown), which is actuated in response to operation of the steering wheel so as to steer wheels to be steered (not shown) through a wheel steering mechanism (not shown).

Figure 1:
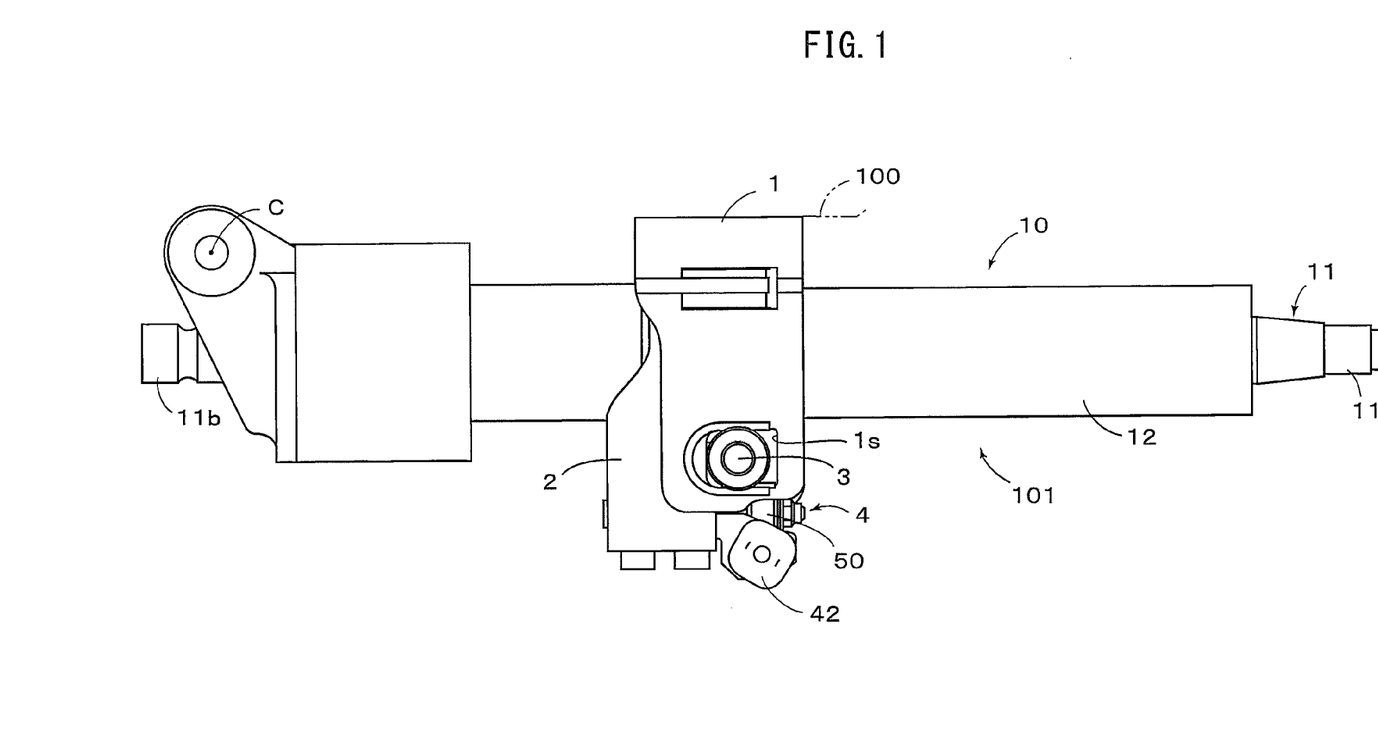
[FIG. 1] is a side view of a steering apparatus according to an embodiment of the present invention.
Figure 2:
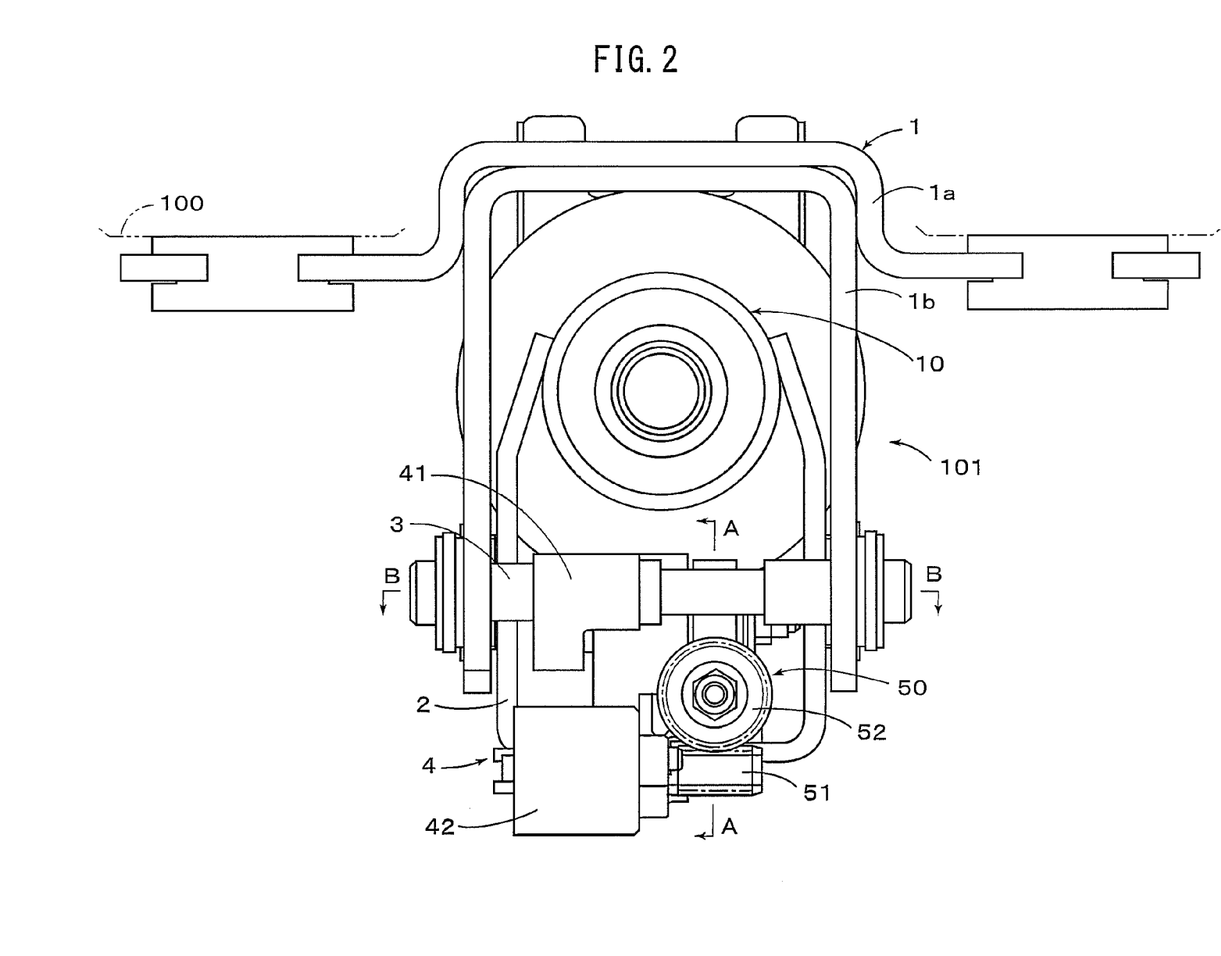
[FIG. 2] is a front view of a steering apparatus according to an embodiment of the present invention.

The fixing bracket 1 comprises an upper bracket 1a having connecting portions to the vehicle body as shown in FIG. 2, and a U-shaped lower bracket 1b connected with the upper bracket 1a (by welding, for example). Also, the tilt bracket 2 is formed in a U-shape, opposite ends of which are fixed to the middle portion of the steering column 10 (by welding, for example). On the tilt bracket 2, a tilt shaft 3 is supported so as to extend in a lateral direction of the vehicle body 100. The fixing bracket 1 is formed with elongated holes (one of which is indicated by "1s" in FIG. 1) having longer dimensions (elongated dimensions) in the axial direction of the steering column 10, on opposite side walls of the lower bracket 1b, respectively. The tilt shaft 3 is disposed to penetrate through the elongated holes 1s in the lateral direction of the vehicle body 100, so that the tilt shaft 3 is supported on the fixing bracket 1 so as to be relatively movable thereto in the axial direction of the steering column 10. In the case where there are clearances between the elongated holes 1s and tilt shaft 3, it may cause looseness on the steering wheel (not shown). Therefore, the clearances should be made as small as possible, or dimensions may be set to provide an interference in advance.

Then, the driving unit 4 of the present embodiment is placed inside of the U-shaped tilt bracket 2, and fixed to the tilt bracket 2 by screws or the like. The driving unit 4 is provided for rotating the tilt bracket 2 about the axis of the tilt shaft 3 so as to adjust a relative position of the tilt bracket 2 to the fixing bracket 1. And, it is provided with a crank member 41 having one end fixed to the tilt shaft 3, an electric motor 42 fixed to the tilt bracket 2, and a speed reducer 50 which reduces a speed of an output of the electric motor 42 and rotates the other end of the crank member 41.

Figure 3:
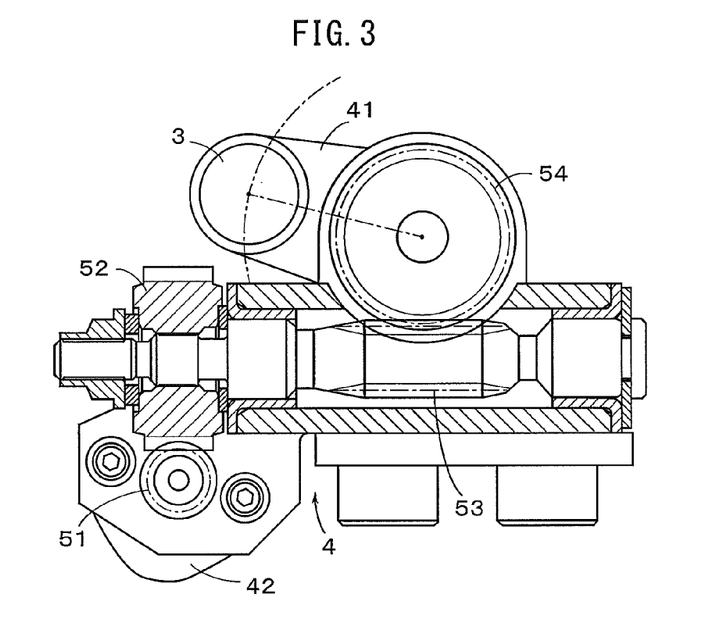
[FIG. 3] is a sectional view sectioned along A-A line in FIG. 2 to show a driving unit provided for an embodiment of the present invention.

The speed reducer 50 of the present embodiment is designed to reduce a reverse efficiency as small as possible so as to be capable of holding a tilt position in accordance with an input of the steering wheel, in order to prevent such a tilt position change that a vehicle driver does not intend from being caused by a load input to the steering wheel (not shown). That is, as shown in FIG. 3, a first phase speed reducing mechanism is configured by a first worm gear 51 fixed to an output shaft of the electric motor 42 and a first worm wheel 52 meshed with the first worm gear 51, and a second phase speed reducing mechanism is configured by a second worm gear 53 rotated integrally with the first worm wheel 52, and a second worm wheel 54 meshed with the second worm gear 53. The first worm wheel 52 and the second worm gear 53 are connected by a spline-connection, for example, thereby to be rotated integrally. Although it is so designed that a rotation output of the electric motor 42 is reduced by the two-phase speed reducing mechanism, a single phase thereof or three-phase thereof may be employed.

Figure 4:
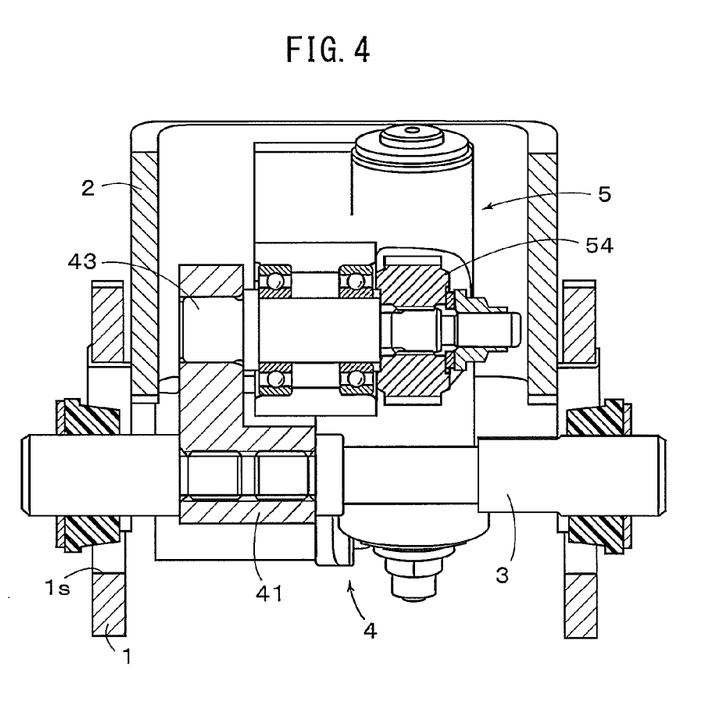
[FIG. 4] is a sectional view sectioned along B-B line in FIG. 2 to show a driving unit provided for an embodiment of the present invention.

And, as shown in FIG. 4, an axial portion of the second worm wheel 54 is connected to one end of a crank rotation shaft 43, the other end of which is connected to the other end of the crank member 41. Therefore, when the electric motor 42 is rotated, the crank member 41 swings about the rotation shaft of the second worm wheel 54. As for connecting means at opposite ends of the crank member 41, any of welding, press-fitting, meshing and the like may be employed, provided that its one end is fixed to the tilt shaft 3 and the other end is fixed to the crank rotation shaft 43.

Figure 5:
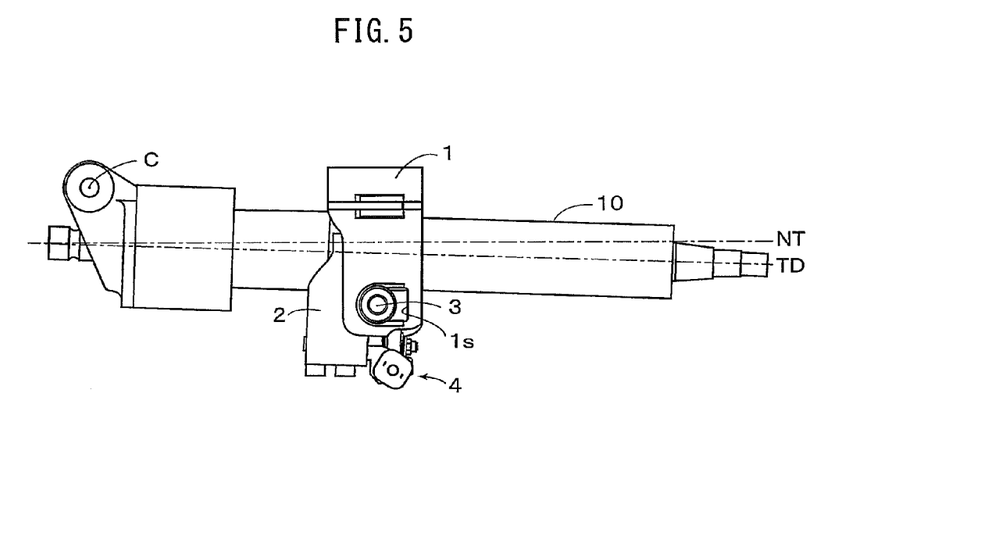
[FIG. 5] is a side view of a steering apparatus according to an embodiment of the present invention to be placed at a tilt-down position.
Figure 6:
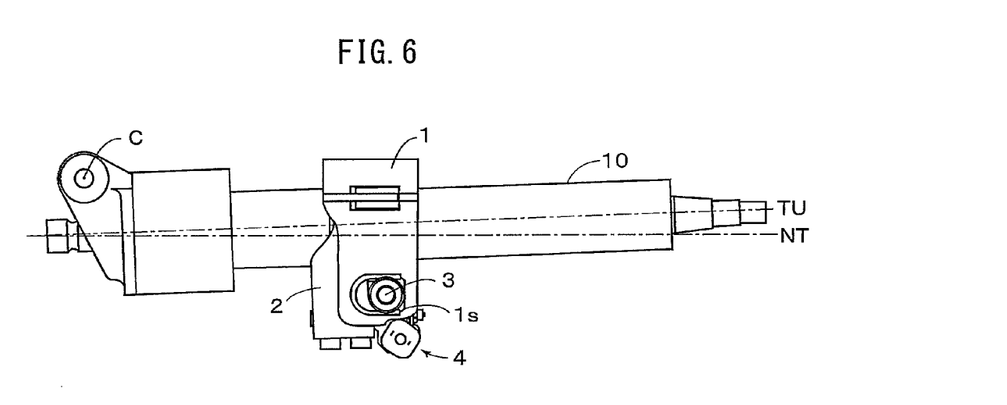
[FIG. 6] is a side view of a steering apparatus according to an embodiment of the present invention to be placed at a tilt-up position.

As the driving unit 4 of the present embodiment is configured as described above, when the electric motor 42 is rotated, its rotational speed is appropriately reduced by the speed reducer 50, and transmitted to the crank member 41, so that the crank member 41 is rotated (swung). Since the tilt shaft 3 is connected to the vehicle body 100 through the fixing bracket 1, the driving unit 4 as a whole is rotated (swung) about the axis of the tilt shaft 3. And, since the driving unit 4 is secured to the tilt bracket 2, the tilt bracket 2 is rotated about the axis of the tilt shaft 3, too. As a result, the steering column 10 integrally connected to the tilt bracket 2 swings about the swinging center (C), so that a tilting operation will be achieved as shown in FIGS. 5 and 6. Consequently, a relative position of the tilt bracket 2 to the fixing bracket 1 is adjusted to place the steering column 10 at a desired tilt position. In FIGS. 5 and 6, "NT" indicates a neutral position (tilt-neutral position), "TD" indicates a tilt-down position, and "TU" indicates a tilt-up position.

In the tilting operation as described above, since the swinging center of the crank member 41 (integral with the tilt shaft 3) and the swinging center (C) of the steering column 10 are different from each other, moving amounts in a columnar axial direction will cause a difference between the driving unit 4 (fixed to the tilt shaft 3) and the steering column 10. In order to cancel this difference, the elongated holes 1s formed on the fixing bracket 1 are set to provide shapes with their longer dimensions (longitudinal dimensions) extending in the axial direction of the steering column 10, so that the tilt shaft 3 is guided by the elongated holes 1s to move in response to a swinging motion of the crank member 4, and stop at positions as shown in FIGS. 5 and 6. Since the present embodiment is configured as described above, the steering apparatus with the electrically operated tilt mechanism can be made small in size, without requiring the prior slide mechanism or link mechanism.

Figure 7:
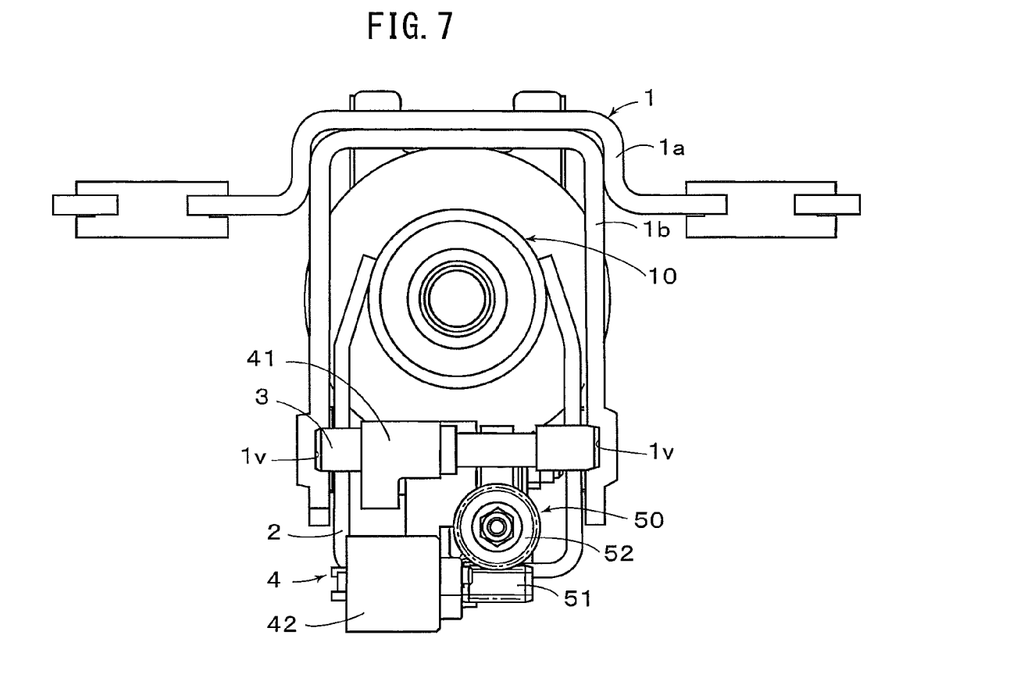
[FIG. 7] is a front view showing another example of a supporting structure of a tilt shaft relative to a fixing bracket according to an embodiment of the present invention.

As for means for supporting the tilt shaft 3 to be relatively movable to the fixing bracket 1 in the axial direction of the steering column 10, it may be so configured that elongated grooves (represented by 1v) are formed in the same shapes as those of the elongated holes 1s inside of the opposite side walls of the fixing bracket 1 as shown in FIG. 7, in lieu of the elongated holes 1s, at the same positions thereof, and the opposite ends of the tilt shaft 3 are slidably fitted onto those elongated grooves 1v. As other components shown in FIG. 7 are the same as those shown in FIGS. 1-4, explanations about substantially the same parts are omitted herein by putting the same reference numerals.

Figure 8:
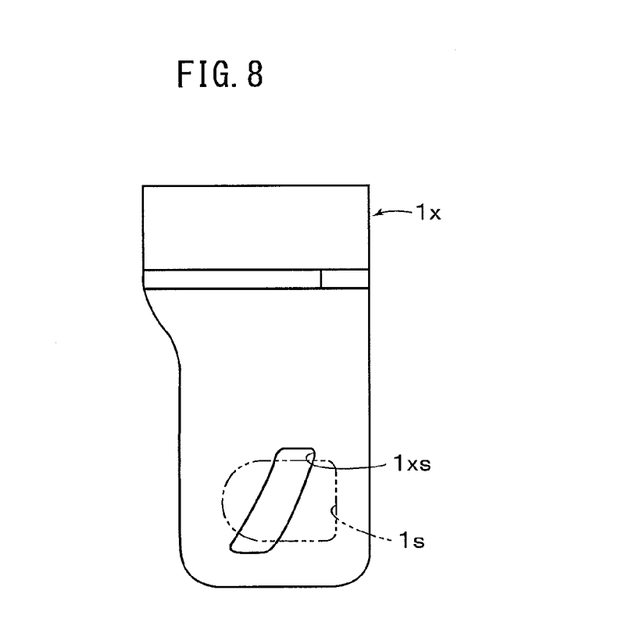
[FIG. 8] is a side view of an embodiment of a fixing bracket which is used when an embodiment of the present invention is transformed into a manually operated tilt mechanism.
Figure 9:
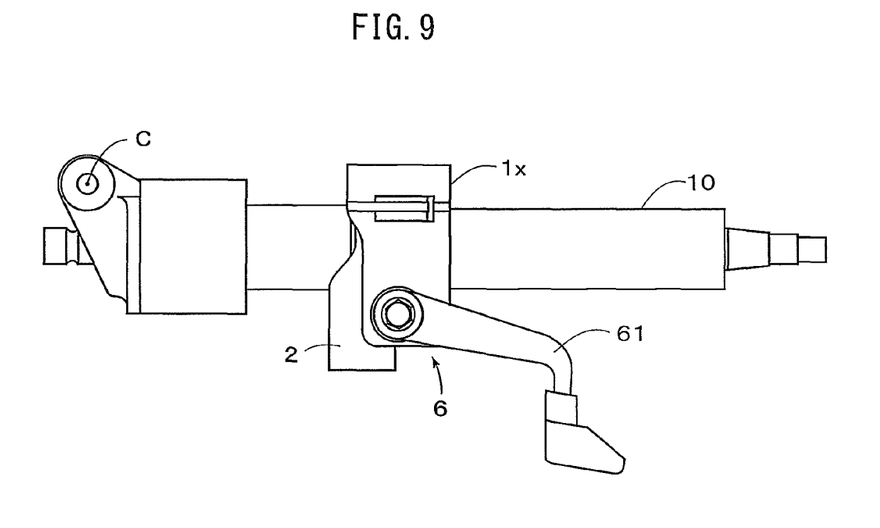
[FIG. 9] is a side view of an embodiment of a steering apparatus when an embodiment of the present invention is transformed to configure a manually operated tilt mechanism.

Also, if a little modification is applied to the fixing bracket 1 in the steering apparatus 101 as configured above, and in lieu of the driving unit 4 as described above, parts for configuring the manually operated tilt mechanism are installed on the tilt bracket 2, such a steering apparatus that is capable of manually performing the tilting operation can be configured. For example, as shown in FIG. 8, if a fixing bracket 1x formed with elongated holes 1xs for use in a manually operated tilt mechanism, which are different in shape from the elongated holes 1s (indicated by two-dotted chain line in FIG. 8) for supporting the tilt shaft 3 as described before, is employed, such a manually operated tilt mechanism 6 that is capable of performing a tilting operation in response to operation of a lever 61 by a vehicle driver, as shown in FIG. 9. Therefore, in the same production line as that of the steering apparatus 101 having the electrically operated tilt mechanism as shown in FIG. 1, if the manually operated tilt mechanism 6 is installed on the steering column 10, the steering apparatus having the same manually operated tilt mechanism as the prior one can be produced. As the manually operated tilt mechanism 6 as shown in FIG. 9 is the same as the prior one (e.g., the one as disclosed in Patent document 2), its explanation is omitted herein. In addition, by using the parts disclosed in FIGS. 1-4 (tilt shaft 3 and etc.) as they are, a new manually operated tilt mechanism may be configured.

As described above, by providing a basic configuration except for the tilt mechanism portion, e.g., steering column 10 and tilt bracket 2, with a common specification, and by using the fixing bracket 1 as shown in FIG. 1 or the fixing bracket 1x as shown in FIG. 8, the electrically operated tilt mechanism or manually operated tilt mechanism can be configured, respectively, whereby such a specification that either mechanism can be selected will be provided. Accordingly, transforming the electrically operated tilt mechanism to the manually operated tilt mechanism, or reverse transforming, can be easily achieved without causing a large cost-up, difficulty in a vehicle installation or the like.

Figure 10:
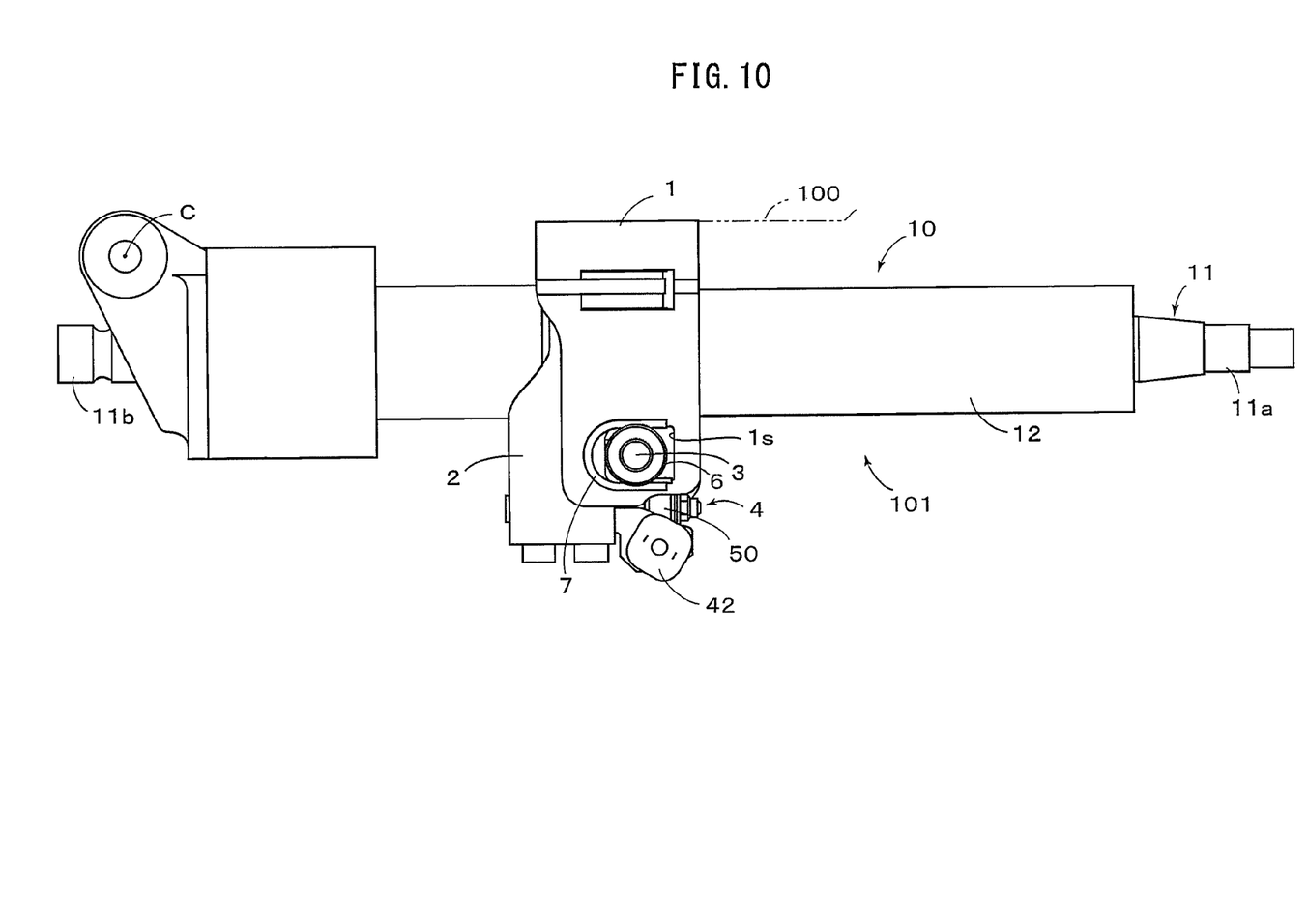
[FIG. 10] is a side view of a steering apparatus according to another embodiment of the present invention.
Figure 11:
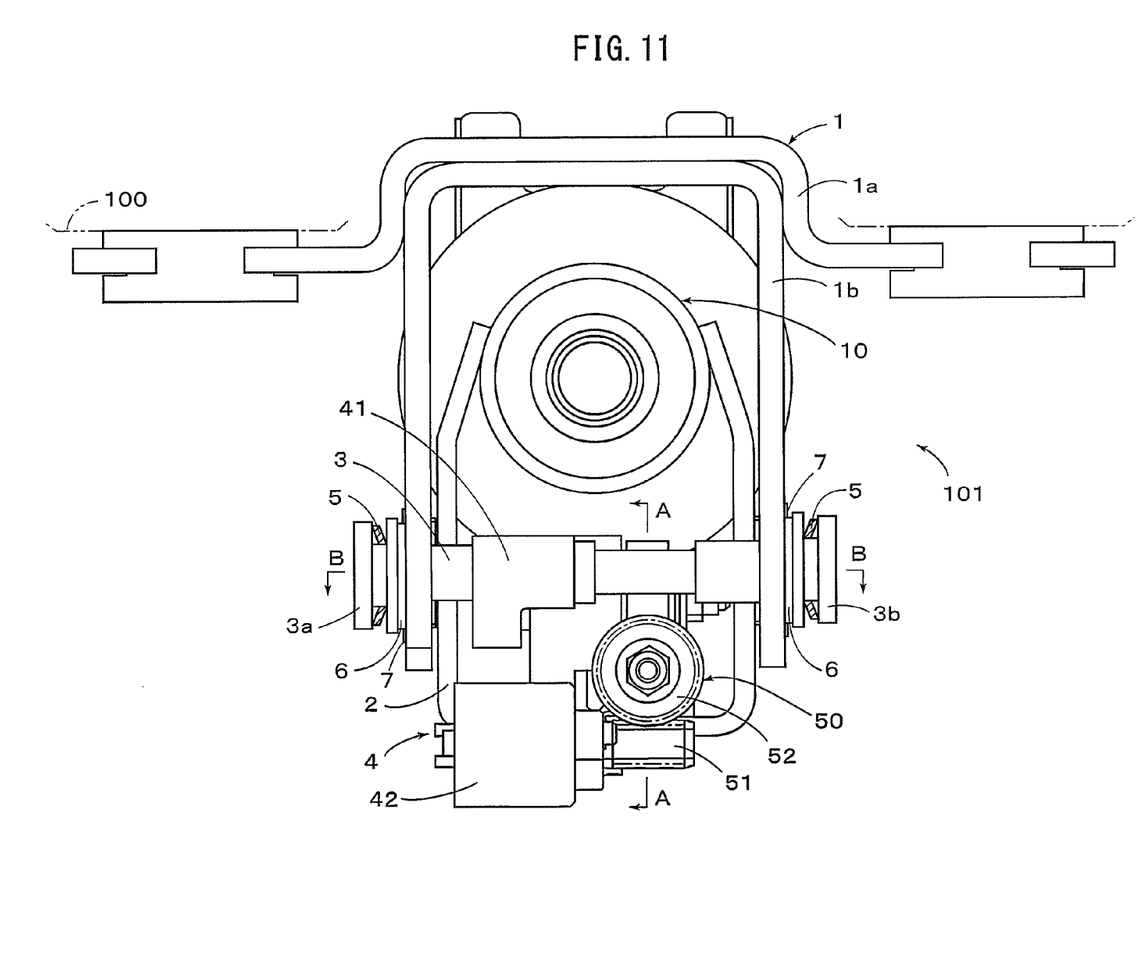
[FIG. 11] is a front view of a steering apparatus according to another embodiment of the present invention.
Figure 12:
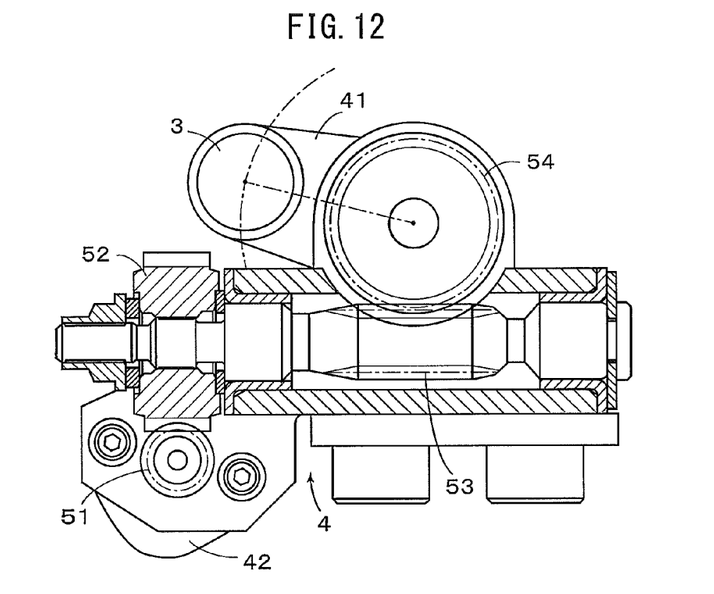
[FIG. 12] is a sectional view sectioned along A-A line in FIG. 11 to show a driving unit provided for another embodiment of the present invention.
Figure 13:
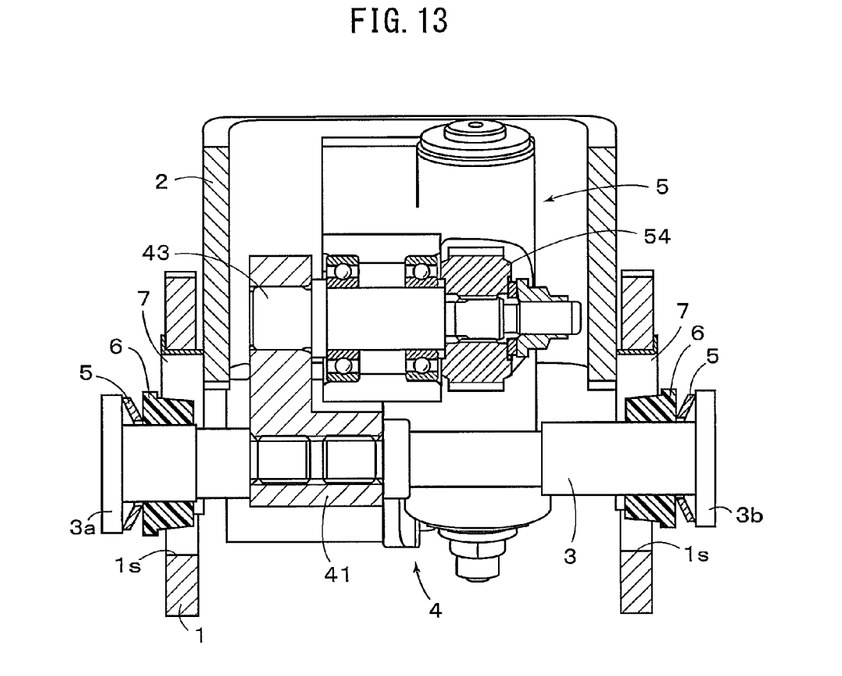
[FIG. 13] is a sectional view sectioned along B-B line in FIG. 11 to show a driving unit provided for another embodiment of the present invention.
Figure 14:
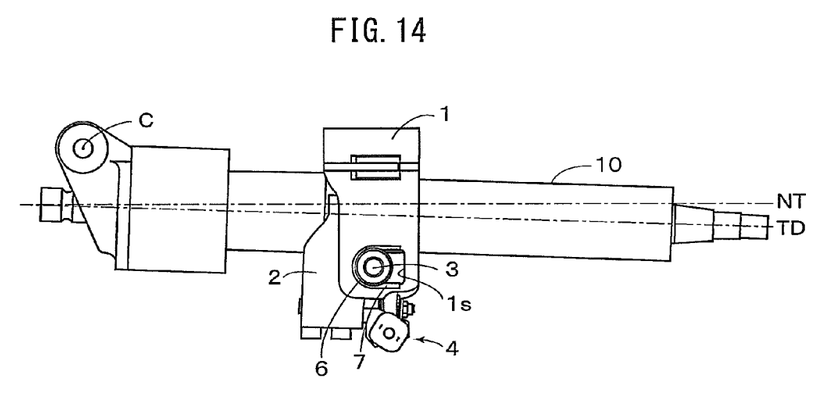
[FIG. 14] is a side view of a steering apparatus according to another embodiment of the present invention to be placed at a tilt-down position.
Figure 15:
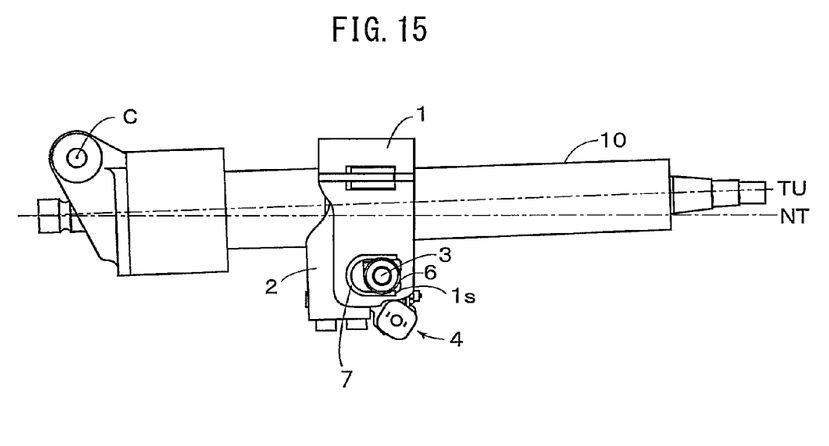
[FIG. 15] is a side view of a steering apparatus according to another embodiment of the present invention to be placed at a tilt-up position.
Figure 16:
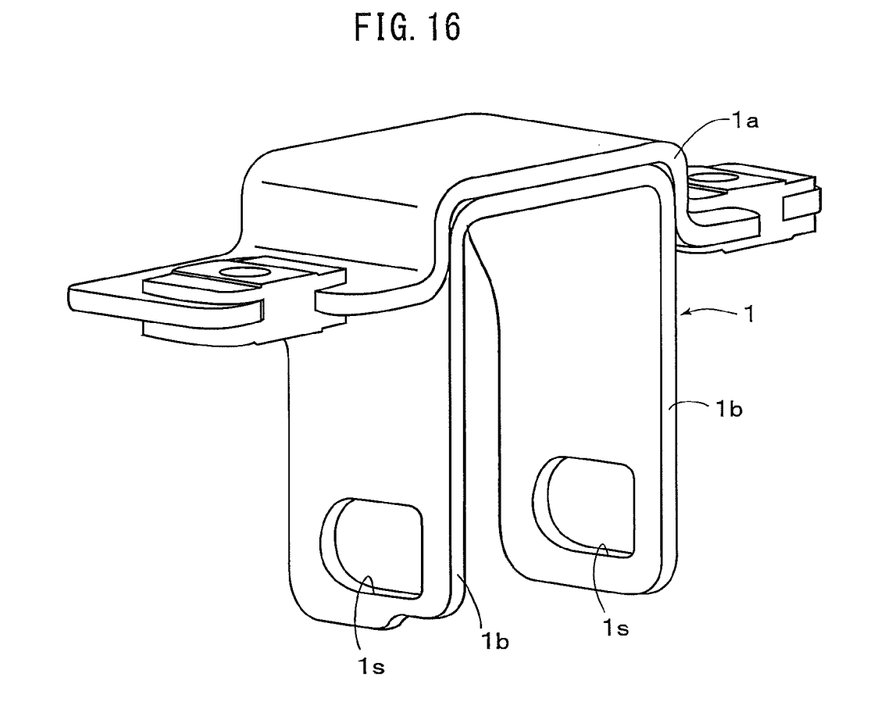
[FIG. 16] is a perspective view of a fixing bracket according to another embodiment of the present invention.

FIGS. 10-17 show another embodiment of the present invention, and the basic configuration as shown in FIGS. 10-15 are the same as the configuration of the embodiment as shown in FIGS. 1-6. Therefore, the same reference numerals are applied to substantially the same parts to avoid a repetition of explanation, and characteristic features of the present embodiment will be explained in detail, hereinafter. According to the present embodiment, as shown in FIGS. 11-13, tilt sliders (represented by 6) are disposed between the elongated holes 1s formed at opposite sides of the fixing bracket 1 (lower bracket 1b) and opposite end portions of the tilt shaft 3, respectively, and the tilt sliders 6 are biased by disc springs (represented by 5) served as the biasing member, in the axial direction of the tilt shaft 3, whereby it is configured so as to surely prevent the backrush resulted from the tilting operation, to ensure a smooth operation.

The tilt shaft 3 of the present embodiment is configured by left and right members divided into two separate members in its axial direction, and engaging head portions 3a and 3b having an identical shape are formed on the respective end portions, as shown in FIG. 13. And, the left and right separate members configuring the tilt shaft 3 are inserted from the left and right sides, into the elongated holes 1s formed on the opposite side walls of the lower bracket 1b, then the male screw portions formed on their opposed end portions are meshed with the female screw portions of the crank member 41, so that the crank member 41 is secured to the tilt shaft 3. With respect to securing means for securing the crank member 41 to the tilt shaft 3, it is not limited to meshing with screws, but pressing insertion or welding may be employed.

Figure 17:
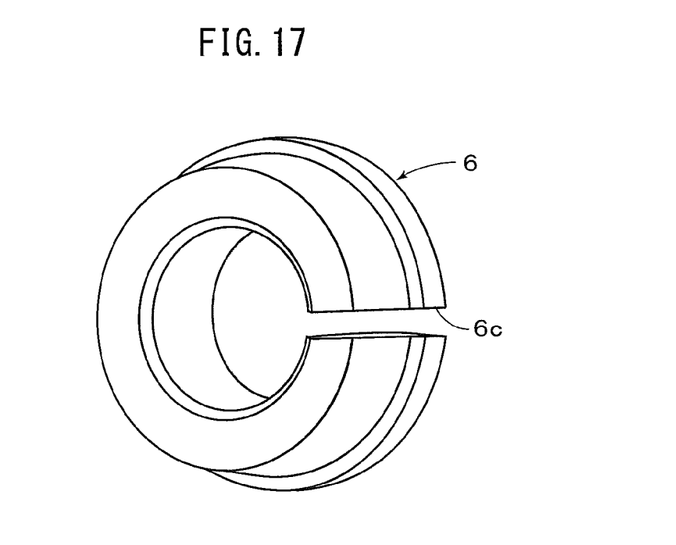
[FIG. 17] is a perspective view of a tilt slider according to another embodiment of the present invention.

The tilt slider 6 of the present embodiment is a hollow circular truncated conical member of a C-shaped cross section having a cutout portion (slit) 6c in its axial direction, as enlarged in FIG. 17, and an inner diameter of its hollow portion is set to be smaller than an outer diameter of the tilt shaft 3. And, a minimal outer diameter of the tilt slider 6 is smaller than a dimension of a shorter side of the elongated hole 1s, and its maximal outer diameter is larger than the dimension of the shorter side of the elongated hole 1s. That is, the tilt slider 6 is formed into a tapered shape, with its smaller outer diameter side being smaller and its larger outer diameter side being larger than the dimension of the shorter side of the elongated hole 1s, and disposed with its smaller diameter side being placed at the column center, to be fitted into the elongated hole 1s. Therefore, when the tilt slider 6 is inserted into the tilt shaft 3, the cutout 6c of the tilt slider 6 is enlarged, with the inner diameter of its hollow portion being enlarged along the outer diameter of the tilt shaft 3, so that the backrush between the tilt shaft 3 and the tilt slider 6 can be prevented. As the tilt slider 6 is required to be elastically deformed, it is desirable to form it with elastic material such as plastic, rubber or the like.

Figure 18:
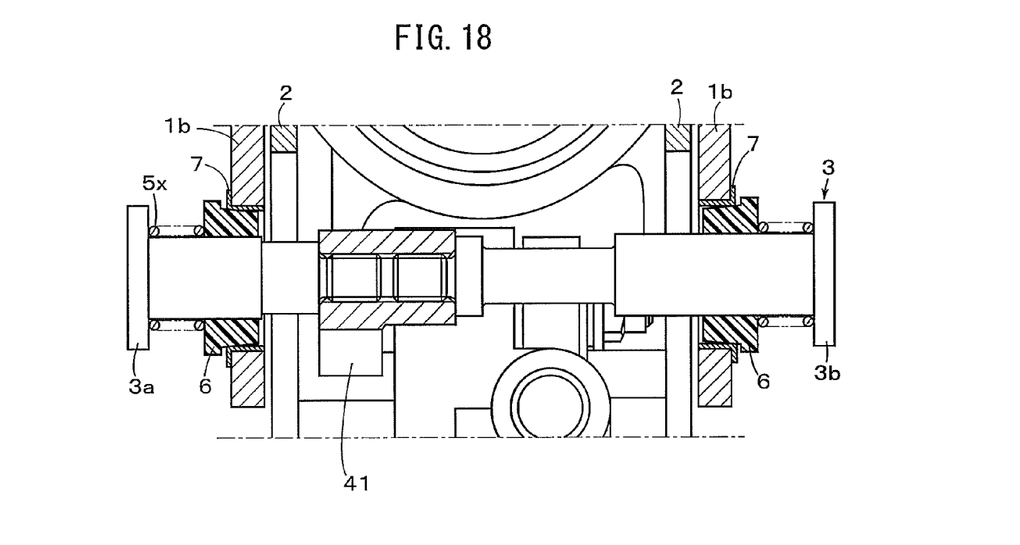
[FIG. 18] is a sectional view showing supporting structures of a biasing member and a tilt shaft according to a further embodiment of the present invention.

Furthermore, according to the present embodiment, as shown in FIGS. 10 and 13, C-shaped bushes 7 made of plastic material for example are fitted into the elongated holes 1s, so that the bushes 7 are disposed between the fixing bracket 1 (lower bracket 1b) and the tilt shaft 3. Although a relationship between the tilt slider 6 and the bush 7 in the vertical direction of the vehicle body is not shown in FIGS. 10 and 13, they are disposed in such a relationship that the tapered surface of the tilt slider 6 abuts on the inner side of the bush 7, like a sectional view as shown in FIG. 18 as described later. Consequently, a smooth sliding motion of the tilt slider 6 within the elongated hole 1s can be ensured. The bushes 7 may be made of metal, whereas they may be omitted, provided that the tilt sliders 6 can be slid smoothly relative to the inner surfaces of the elongated holes 1s.

As described before, according to the present embodiment, the disc springs 5 are disposed between the engaging head portions 3a and 3b of the tilt shaft 3 and each tilt slider 6, respectively, so that the tilt slider 6 is biased in the axial direction of the tilt shaft 3. Accordingly, such a biasing force that the tilt slider 6 is pressed toward the column center is applied, so that the tapered surface of the tilt slider 6 is pressed (through the bush 7) onto the inner surface of the elongated hole is at its smaller diameter side, whereby the backrush that may be caused between them can be prevented. Furthermore, with the biasing force of the disc spring 5 being set appropriately, if there arise dispersion of initial dimensions of the tapered surface of the tilt slider 6 or the inner surface of the elongated hole is and aged deterioration such as wear, they will be absorbed, with the tilt slider 6 being moved in the axial direction of the tilt shaft 3 (and toward the column center), to prevent the backrush or pinch from being caused.

With respect to the structure of supporting the tilt shaft 3 to be relatively movable to the fixing bracket 1 in the axial direction of the steering column 10, in lieu of the disc springs 5, coil springs 5x may be employed as the biasing member, as shown in FIG. 18. Other components shown in FIG. 18 are the same as those shown in FIGS. 10-13, so that explanations about substantially the same parts are omitted herein by putting the same reference numerals.

Figure 19:
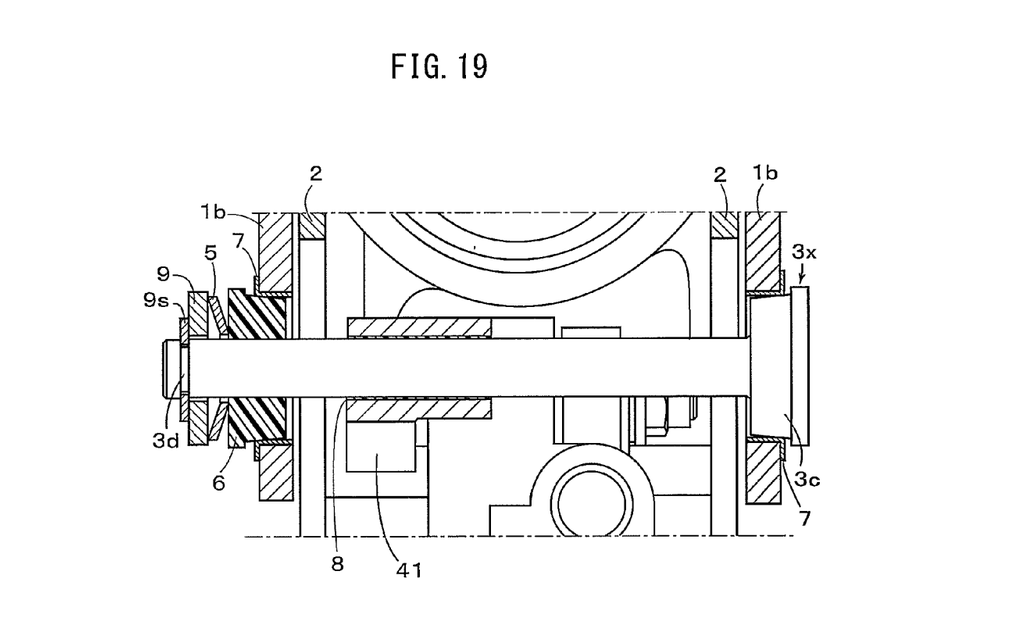
[FIG. 19] is a sectional view showing a tilt shaft and its supporting structure according to a yet further embodiment of the present invention.

FIG. 19 shows a supporting structure of a tilt shaft according to a further embodiment of the present invention, wherein a tilt shaft 3x made of a single member is employed, and one end of the tilt shaft 3x is formed with a head portion 3c having the same tapered surface as that of the tilt slider 6 as described above. The other end of the tilt shaft 3x is formed with an engaging groove 3d. The end portion formed with the engaging groove 3d is inserted from one elongated hole is into the hollow portion of the crank member 41 through a bush 8, then, in such a state as being extruded from the other elongated hole 1s, the slider 6, disc spring 5 and annular shim 9 are assembled in sequence, and then a stopper 9s (e.g., C-ring) is engaged with the engaging groove 3d, to be secured.

As it is configured in FIG. 19, not only the tilt shaft 3x can be made of a single member, but also the pressing force to the lower bracket 1b can be applied only by the single disc spring 5 to both of the tapered surface of the head portion 3c of the tilt shaft 3x and the tapered surface of the tilt slider 6. According to this embodiment, as the tilt shaft 3 is required to be movable in the axial direction by the biasing force of the disc spring 5, the bush 8 having an interference is disposed between the hollow portion of the crank member 41 and the tilt shaft 3x, and configured to be movable in the axial direction, and not to be movable in a direction perpendicular to the axis.

Furthermore, if a little modification is applied to the fixing bracket 1 of the steering apparatus according to each embodiment as described above, and in lieu of the driving unit 4, parts for configuring the manually operated tilt mechanism are installed on the tilt bracket 2, a steering apparatus capable of manually performing a tilting operation. That is, by providing a basic configuration except for the tilt mechanism portion, e.g., steering column 10 and tilt bracket 2, with a common specification, and by using the fixing bracket 1 or a fixing bracket (not shown) for the manually operated tilt mechanism, the electrically operated tilt mechanism or manually operated tilt mechanism can be configured, respectively, whereby such a specification that either mechanism can be selected will be provided. Accordingly, transforming the electrically operated tilt mechanism to the manually operated tilt mechanism, or reverse transforming, can be easily achieved without causing a large cost-up, difficulty in a vehicle installation or the like.

DESCRIPTION OF CHARACTERS

1 fixing bracket
1s elongated hole
1v elongated groove
2 tilt bracket
3,3x tilt shaft
4 driving unit
5 disc spring (biasing member)
5x coil spring (biasing member)
6 tilt slider
7,8 bush
10 steering column
41 crank member
42 electric motor
50 speed reducer
100 vehicle body
101 steering apparatus

The invention claimed is:

1. A steering apparatus for a vehicle comprising:
a fixing bracket fixed to a vehicle body;
a steering column supported on the vehicle body to be swingable;
a tilt bracket holding the steering column and supported on the fixing bracket to be relatively movable thereto;
a tilt shaft extending in a lateral direction of the vehicle body and supported on the fixing bracket to be relatively movable thereto in an axial direction of the steering column; and
a driving unit rotating the tilt bracket about an axis of the tilt shaft to adjust a relative position of the tilt bracket to the fixing bracket.

2. A steering apparatus for a vehicle as claimed in claim 1, wherein the driving unit comprises a crank member with one end thereof fixed to the tilt shaft, an electric motor fixed to the tilt bracket, and a speed reducer reducing an output of the electric motor and rotating the other end of the crank member.

3. A steering apparatus for a vehicle as claimed in claim 1, wherein the fixing bracket is formed with elongated holes having elongated dimensions in the axial direction of the steering column, and wherein the tilt shaft is supported in the elongated holes to be relatively movable thereto.

4. A steering apparatus for a vehicle as claimed in claim 3, comprising a tilt slider disposed between a first of the elongated holes and the tilt shaft, and a biasing member biasing the tilt slider in the axial direction of the tilt shaft.

5. A steering apparatus for a vehicle as claimed in claim 4, wherein the tilt slider is a hollow circular truncated conical member having a cutout portion in an axial direction thereof, and wherein an inner diameter of a hollow portion of the hollow circular truncated conical member is smaller than an outer diameter of the tilt shaft, a minimal outer diameter of the hollow circular truncated conical member is smaller than a dimension of a shorter side of the first elongated hole, and a maximal outer diameter of the hollow circular truncated conical member is larger than the dimension of the shorter side of the first elongated hole.

6. A steering apparatus for a vehicle as claimed in claim 5, wherein the biasing member is a disc spring biasing the tilt slider in the axial direction of the tilt shaft.

7. A steering apparatus for a vehicle as claimed in claim 5, wherein the biasing member is a coil spring mounted on the tilt shaft to bias the tilt slider in the axial direction of the tilt shaft.

8. A steering apparatus for a vehicle as claimed in claim 4, comprising a bush fitted into the first elongated hole, and disposed between the fixing bracket and the tilt slider.

9. A steering apparatus for a vehicle as claimed in claim 2, wherein the tilt shaft is divided into two members, opposed end portions of which are connected with the crank member.

10. A steering apparatus for a vehicle as claimed in claim 2, wherein the speed reducer comprises a first worm gear fixed to an output shaft of the electric motor, a first worm wheel meshed with the first worm gear, a second worm gear rotated integrally with the first worm wheel, and a second worm wheel meshed with the second worm gear, and wherein a rotation shaft of the second worm wheel is fixed to the other end of the crank member.

* * * * *